June 3, 1958      M. J. LUGASH      2,837,227
LOAD ELEVATOR FOR MOTOR TRUCKS
Filed April 15, 1957      2 Sheets-Sheet 1
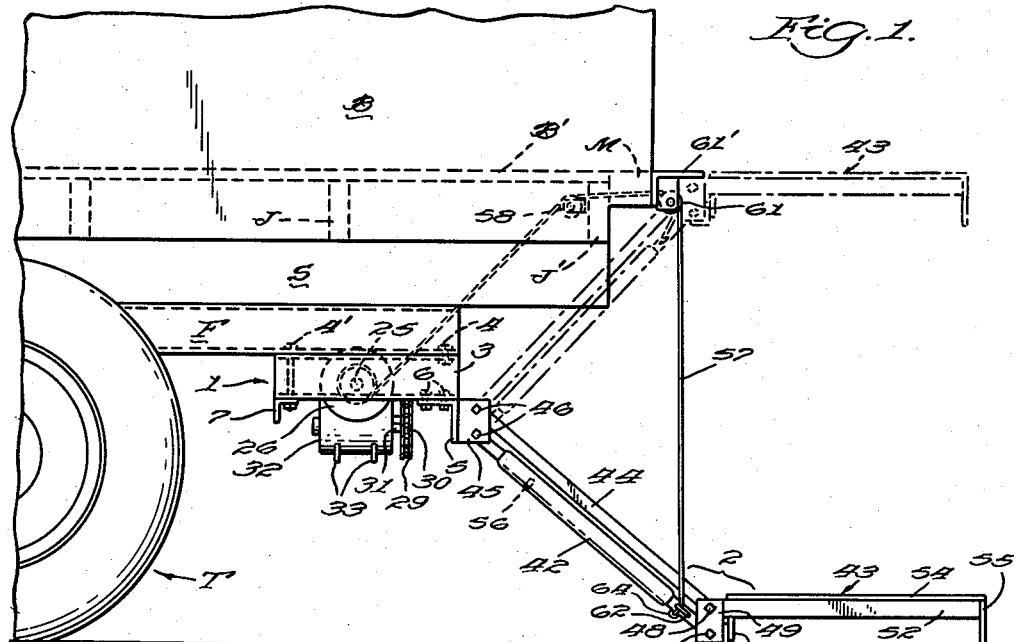
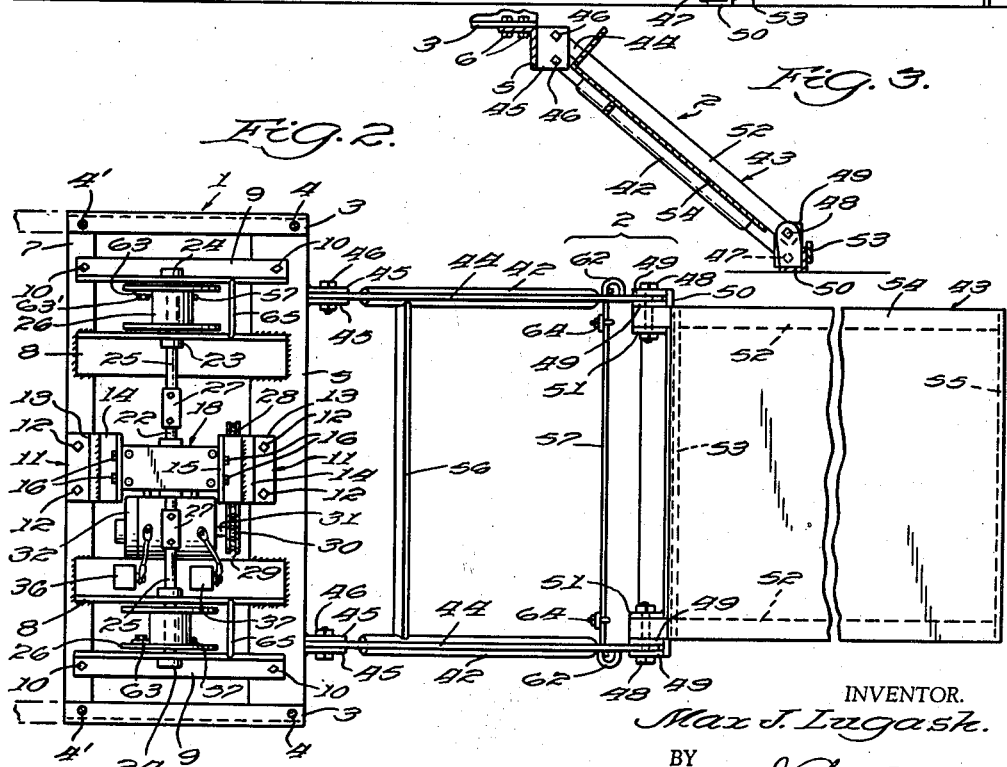
INVENTOR.
Max J. Lugash.
BY
Harold J. LeVesconte
Atty.

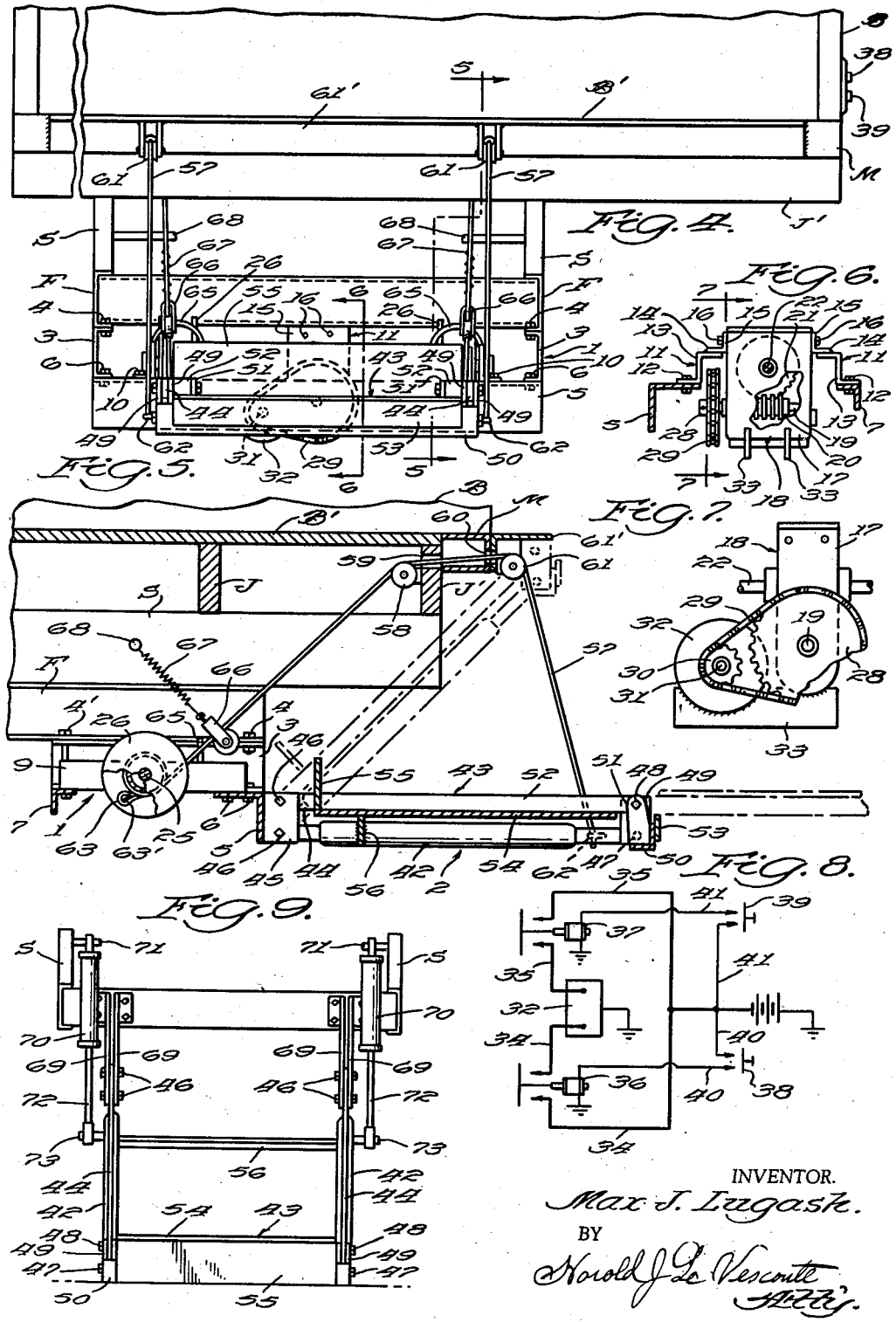

United States Patent Office 2,837,227
Patented June 3, 1958

2,837,227

LOAD ELEVATOR FOR MOTOR TRUCKS

Max J. Lugash, North Hollywood, Calif.

Application April 15, 1957, Serial No. 652,860

11 Claims. (Cl. 214—77)

This invention relates to hoisting devices and more particularly to devices attachable to the rear end of a motor truck and operable to lift loads from ground level to level of the truck bed and vice versa.

The principal object of the invention is to provide a load elevating means which is attachable to the rear end of a truck frame and which is operable to lift or lower a load relative to the level of the truck bed.

Another object of the invention is to provide a device of the above character which may be folded up or collapsed beneath the truck bed when not in use.

A further object of the invention is to provide a load elevating means for the rear ends of motor trucks which is additionally useful as a rear step for the truck.

Still another object of the invention is to provide a load elevating means for the rear ends of motor trucks which is powered by connection to the power means for the truck.

A still further object of the invention is to provide a load elevating means for motor trucks in which the foregoing objects are realized in practice and which is simple in construction, economical to manufacture, is readily installed, does not require skill to operate, and which is reliable for its intended purpose.

With the foregoing objects in view, together with such additional objects and advantages as may subsequently appear, the invention resides in the parts, and in the construction, combination and arrangement of parts, described, by way of example; in the following specification of a presently preferred embodiment of the invention; reference being had to the accompanying drawings which form a part of said specification and in which drawings:

Fig. 1 is a side elevational view of the rear end of a truck to which the illustrated embodiment of the invention is applied, the lowered position being shown in full lines and the raised position being shown in broken lines, Fig. 2 is a top plan view of the device taken on the plane of the attachment thereof to the truck frame, Fig. 3 is a fragmentary vertical sectional view taken on the line 3—3 of Fig. 2 but showing the platform element folded back preparatory to either moving the device to inactive position or to serve as a rear step for the truck, Fig. 4 is a rear elevational view of the device with the platform folded back and partially raised to serve as a rear step for the truck, Fig. 5 is a sectional view taken on the line 5—5 of Fig. 4 showing also in dotted lines the position occupied by the device when moved to inoperative position beneath the truck bed, Fig. 6 is a fragmentary sectional view taken on the line 6—6 of Fig. 4 with portions broken away and showing details of the speed reducing unit, Fig. 7 is a fragmentary elevational view of the left hand side of Fig. 6 showing still other details of the speed reducing unit, Fig. 8 is a circuit diagram of electrical system employed with the embodiment of the form of the invention shown in Figs. 1 through 7, and Fig. 9 is a rear end elevational view of a second form of the device employing hydraulic cylinders as the actuating power means.

Referring to the drawings, the device is shown as applied to a truck T having a body B including a bed B' supported on transverse joists J rising from sills S, S secured to the truck frame members F, F. The device comprises a power component generally indicated at 1 and a platform component and its supporting means generally indicated at 2. The power component comprises a rectangular frame disposed beneath the rear ends of the truck frame side members F, F and includes end members 3, 3 formed of steel channels disposed with the channels thereof facing each other and with the upper sides thereof parallel to and bolted to the side members F, F by bolts 4 and 4'. Adjacent their rear ends, the channels are connected by an angle iron member 5 disposed with one leg thereof parallel to the under faces of the end members 3, 3 and secured thereto by bolts 6, 6 and with the other leg thereof depending in the plane of the rear ends of the end members. The forward ends of the end members are connected by a second angle iron member 7, arranged with one leg thereof disposed parallel to the under faces of the end members and secured thereto by the bolts 4', 4', which extend through the lower flanges of the side members F, F thence through the flanges of the end members and through the said one leg of the angle iron 7. At equally spaced distances from their ends, the angle iron members 5 and 7 are secured in spaced parallel relation by angle iron inboard, bearing supporting members 8, 8 welded thereto and by outboard, angle iron bearing supporting members 9, 9 disposed adjacent the ends of the members 5 and 7 and secured thereto by bolts 10. Intermediate their ends, the members 5 and 7 have power unit supporting brackets 11, 11 secured to the top faces thereof by bolts 12 and each bracket comprises a short length of Z-bar iron 13 having a short length of angle iron 14 welded to the top face thereof with the vertical legs 15, 15 thereof spaced from and facing each other. Bolts 16 extending through the legs 15, 15 secure the upper end of the case 17 of a worm gear speed reducer 18 between them. The speed reducer case affords bearing support for a drive shaft 19 carrying a worm 20 within the case and meshing with a worm gear 21 carried by a driven shaft 22 projecting from both ends of the case transversely of the truck. The adjacent inboard and outboard bearing supporting members respectively carry bearings 23 and 24 which are axially aligned with the shaft 22 and these bearings support shafts 25, 25 which between the respective pairs of bearing members carry winch drums 26. Couplings 27 unite the adjacent ends of the shafts 25, 25 with the shaft 22. Externally of the case 18, the drive shaft 19 carries a sprocket wheel 28 which is connected by a sprocket chain 29 with a sprocket pinion 30 carried by the drive shaft 31 of a reversible electric motor 32 mounted on laterally extending brackets 33, 33 carried by the lower end of the gear case 18. Referring to Fig. 8 it is to be noted that the motor is connected to the truck battery or other source of energy by leads 34 and 35 extending through normally open relays 36 and 37, respectively and that the said relays are energized by switches 38 and 39, respectively interposed in leads 40 and 41 between the battery and the relay coils. When the switch 38 is closed the relay 36 will close the circuit through the lead 34 to operate the motor in one direction and when the switch 39 is closed, the relay 37 will be closed allowing current through the lead 35 to operate the motor in the opposite direction. Operation of the motor in one or the other directions, will effect rotation of the drums 26 simultaneously in the desired direction.

The platform component 2 is connected to the power component by two parallel rule linkage systems comprising in the illustrated embodiment of the invention, a pair of lifting bars 42, 42 disposed one at each side of the platform 43 and a pair of lazy bars 44, 44 disposed one each above each of the lifting bars 42, 42 and extending parallel thereto. The member 5 on its rear face is provided with spaced pairs of flanges 45, 45 and one end of each combination of a lifting bar and a lazy bar is disposed between a pair of the flanges 45 and hingedly secured therein in vertically spaced relation by bolts 46. At their other ends, the bars are similarly hingedly secured by bolts 47 and 48 between pairs of flanges 49, 49 carried by the front face of a cross member angle iron 50. The lifting bars carry the load of the platform and the load carried thereby and are therefore made sufficiently strong for that purpose. An effective means of achieving this is by forming the lifting bars of pipe with flat bar portions welded to the ends thereof. Other cross section configurations may be used so long as sufficient rigidity for the loads to be imposed is achieved. The main function of the lazy bars is to maintain parallelism and hence they may be formed of lighter section material. Since the lifting bars and the lazy bars are of the same length between the pivot bolt holes in the ends thereof and since the bolts 46 are disposed in a vertical plane, any pivotal movement of the bars will maintain the angle iron cross member 50 in the same parallel relation to the member 5 in all positions.

The flanges 49, 49 at the points of connection to the lazy bars 44 are disposed above the top edge of the cross member 50 and inwardly of each of these pairs of flanges is one each of a pair of flanges 51 having holes therein aligned axially with the holes through which the bolts 48, 48 extend to hingedly secure the ends of the lazy bars between the flanges 49. Disposed between each of the flanges 51 and the adjacent one of the flanges 49 is the end of a bracket arm 52 and the bolts 48, 48 extend through the flanges 49 to secure the lazy bar end and thence through the ends of the bracket arms 52 and the flange 51 to hingedly secure the bracket arms to the cross member 50. The side face of the vertical leg of the angle iron member 50 carries a ledge element 53 disposed in the paths of movement of the bracket arms 52, 52 effective to prevent pivotal movement of the bracket arms in a clockwise direction as viewed in Fig. 1 beyond a point at which they extend in a horizontal direction. The platform plate 54 is secured to the top faces of the bracket arms and an end plate 55 secured to the distal ends of the bracket arms and the corresponding edge of the platform plate extends downwardly to the plane of the cross member 50 and combines therewith to provide support for the platform when lowered to the ground or a floor as shown in Fig. 1. It is to be noted that the location of the flanges 45 and the bolts 46 is such that when lifted to the highest point, the cross member 50 is in close juxtaposition to the rear end of the truck bed.

When not in use, the platform is folded back as shown in Figs. 4 and 5 resting on a cross member 56 secured to and extending between the upper ends of the lifting bars 42, 42.

Lifting and lowering of the platform is achieved by a cable 57 having its opposite ends secured to the inner faces of the winch drum flanges and thence extending from one of said drums over a pulley 58 secured to the inner face of the rear joist J' of the truck body, thence through holes 59 and 60 in the said joist and the rear member M of the truck body, thence over a pulley 61 carried by a bracket 61' attached to said rear member, thence through loops 62, 62 on the outer surfaces of the distal end of the lifting bars thence beneath the lifting bars and thence over similarly located pulleys 58 and 61 and through similarly disposed holes 59 and 60 at the other side of the truck body and back to the other drum to which it is secured in the same manner as to the first mentioned drum. The ends of the cable are formed into loops 63 and each loop is secured to the side of the inner face of one of the drum flanges by a bolt 63' with sufficient looseness to permit the loop to turn thereof. The reason for thus securing the cable to the drums is to prevent the cable from being closely doubled on itself in the event that the drums should be operated to a point at which the cable was completely unwound therefrom and winding up in the opposite direction occurred. With this mounting of the cable on the drums, the loops will simply swing around on the bolts and take any applied strain in straight tension. Between the lifting bars 42, 42, the cable is supplied with clamp members 64, 64 spaced slightly away from the inner faces of the lifting bars. These clamps are so positioned to serve as stops effective in the event of cable breakage to engage one or the other of the side bars and thus permit one or the other of the drums to support the load and to allow it to be lowered to the ground safely. Additional safeguards for the cable comprise the guards 65, 65 each extending between the vertical legs of the bearing supporting members 8 and 9 adjacent to each of the drums, and idler pulleys 66 disposed between the drums and the pulleys 58; said idler pulleys each being supported by a tension spring 67 having one end attached to the idler pulley and the other attached to a bracket arm 68 projecting outwardly from the truck body sill S.

Normally, the device is carried in the manner shown in dotted lines in Fig. 5 with the platform folded over against the cross member 56 and the entire device lifted as high as possible by the rotation of the drums. When it is desired to employ the device to lift a load to the truck bed, the drums are rotated by the motor until the lifting and lazy bar linkages are lowered until the cross member 50 touches the ground or the floor, this being the position shown in Fig. 3. The platform is then opened out to the position shown in full lines in Fig. 1, the load placed thereon and the drums are rotated to wind up both ends of the cable until the platform is raised to the level of the truck bed as shown in Fig. 1 in dotted lines. After removal of the load and assuming that the loading operation is finished, the platform is lowered to the approximate position shown in full lines in Fig. 3 to afford clearance for the outer end of the platform as it is folded back and the device is then raised to the inactive position. Where the inactive device is to be employed for unloading, the device is first lowered sufficiently to allow the platform to be folded or swung to operative position and then is lifted to the truck bed level for loading. Additionally, when the device is to be employed as a rear step, it is lowered to the desired level with the platform in either the folded or extended position as may be desired. The controlling switches may be mounted on either side of the truck or a single reversing switch may be located on the end of a multiple conductor flexible cable so that operation of the motor can be controlled from any desired point either on the truck or platform or adjacent to the rear end of the truck. Such variations would be made to suit the wishes of the user.

Referring finally to Fig. 9, there is shown the substitution of hydraulic means for lifting the platform instead of the winch and cable means previously described. In this embodiment of the invention the rear of the truck body is provided with pairs of depending flanges 69, 69 extending downwardly therefrom the approximate position of the flanges 45 in the first described form of the invention and each pair of said flanges serves as the anchor or pivot point for a lifting bar and a lazy bar in the same manner as the flanges 45, 45. The platform structure is the same as previously described and therefore the component parts have been given the same identifying numerals as in the first form of the invention. The lifting means comprises a pair of hydraulic cylinders 70, 70 disposed one at each side of the platform and arranged with the closed ends of the cylinders pivoted on supporting arms 71, 71 on the truck sill S, S and with the ends of the piston rods 72, 72 thereof pivotally connected to bracket arms 73, 73 extending outwardly from the lifting bars 42, 42. The control for said cylinders would be any conventional form of hydraulic pump and reversing valve and illustration and description thereof is not deemed necessary to an understanding of the present invention. On supply of fluid pressure to the lower ends of the cylinders, the pistons would be moved upwardly lifting the platform to the desired extent. When not in use, the platform would be folded onto the cross bar and the entire device raised into carrying position.

Thus there has been created a simple lifting device for mounting on motor trucks. The device in addition to being simple in construction is light in weight and thus offers little interference with the truck load capacity. When not in use, it is effectively concealed beneath the truck body and thus does not interfere with normal loading and unloading operations.

While the foregoing specification discloses certain presently preferred embodiments of the invention, it is not to be inferred therefrom that the invention is limited to the exact forms thereof disclosed by way of example and it will be understood that the invention includes all such changes and modifications in the parts, and in the construction, combination and arrangement of parts as shall come within the purview of the appended claims.

I claim:

1. In a load lifting and lowering means attachable to the rear end of a motor truck, a platform on which the load is carried, supporting means for said platform and to which said platform is connected for hinged movement about a horizontal axis, means carried by said supporting means effective to prevent movement of said platform about said hinged mounting beyond a position in which said platform projects rearwardly from the truck and in a plane substantially parallel to the plane of the truck bed, identical parallel rule linkage systems at each side of said platform pivotally connected to the truck and to said platform supporting means for movement about horizontal axes, and reversible, manually controlled power means on the truck and connected to each of said parallel rule linkage systems effective to cause said parallel rule linkage systems to lift said platform supporting means and said platform from ground level to the plane of the truck bed or to any desired intermediate extent and upon reversal of said power means to allow the weight of said platform to cause it to descend to a desired extent; said parallel rule linkage systems including stop means against which said platform may be swung about said hinged mounting to a position overlying and parallel to said linkage systems.

2. A load lifting and lowering means as claimed in claim 1 in which said power means comprises hydraulic pressure responsive means.

3. A load lifting and lowering means as claimed in claim 1 in which said power means comprises an electric motor and winch and cable means connected to said parallel rule means.

4. A load lifting and lowering means as claimed in claim 1 in which said parallel rule linkage systems are pivotally connected to the truck at identical points so chosen with respect to the length of the members of said parallel rule linkage systems that when raised to the extreme upper position by said power means, said platform supporting means is in close juxtaposition to and does not extend above the plane of the top surface of the rear end of the truck bed.

5. In a means for transporting a load to and from the rear end of a motor truck, a load supporting platform, power means for elevating said platform, a frame structure mounted on the truck frame below the rear end of the truck bed and supporting said power means, and parallel rule linkage systems connecting said platform to said frame structure; said power means comprising a reversible electric motor, manually operable control means for said motor, a pair of winch drums operatively connected to said motor for simultaneous rotation, and a cable having the ends thereof attached to said winch drums, thence extending over pulley means disposed adjacent to the rear end of the truck bed and thence engaging said parallel rule linkage systems.

6. A load elevating means as claimed in claim 5 in which said parallel rule linkage systems comprises a first pair of bars disposed one above the other at one side of said platform and pivotally connected to said frame structure and said platform, a second pair of bars identical to said first pair at the other side of said platform and in which said cable has the ends thereof attached one each to each of said drums and extends in a loop from the respective pulley means beneath the lowermost bars of each of said pairs with resultant compensatory equalization for variations in the rates of simultaneous winding or unwinding of the ends of said cable by said drums.

7. A load elevating and lowering means as claimed in claim 5 in which said platform is hingedly mounted on said parallel rule linkage systems with capacity deriving from said hinged mounting for being folded back against said parallel rule linkage systems with resultant positioning out of the way when not in use.

8. In a load lifting and lowering means attachable to a load carrying vehicle at a point thereon below the vehicle bed, a platform on which the load is carried, a pair of parallel rule linkage systems disposed one each adjacent each side of said platform, each of said linkage systems having one end thereof attached to the vehicle at a point below the plane of the vehicle bed and the other end thereof connected to said platform, the connections between said linkage system and said platform including horizontally disposed hinge means and stop means effective to permit said platform to be swung on said hinge means into superposed position on said linkage systems and to prevent said platform from being swung on said hinge means in the opposite direction beyond a position in which said platform extends with the load carrying surface thereof substantially parallel to the plane of the vehicle bed, and power means operable optionally to lift said platform bodily or to allow said platform to descend.

9. A load lifting and lowering means as claimed in claim 8 in which said linkage systems are pivoted to the vehicle at a point substantially midway between the ground level and the vehicle bed, whereby, with said linkage systems raised to a horizontal position and with said platform swung into said superposed position, said platform serves additionally as a step for the vehicle.

10. A load lifting and lowering means as claimed in claim 8 in which said power means comprises motor driven winch and cable devices.

11. A load lifting and lowering means as claimed in claim 8 in which said power means comprises hydraulic cylinder means.

References Cited in the file of this patent

UNITED STATES PATENTS

| | | |
|---|---|---|
| 2,298,166 | Richards | Oct. 6, 1942 |
| 2,527,818 | Ives | Oct. 31, 1950 |
| 2,684,770 | Park | July 27, 1954 |
| 2,698,103 | Rostine | Dec. 28, 1954 |